United States Patent [19]

Tanaka et al.

[11] Patent Number: 4,868,050

[45] Date of Patent: Sep. 19, 1989

[54] INTERLEAF-CONTAINING, FIBER-REINFORCED EPOXY RESIN PREPREG

[75] Inventors: Hideho Tanaka; Kazuyoshi Fujii; Kazuo Nishimura, all of Hirakata, Japan

[73] Assignee: Ube Industries, Ltd., Yamaguchi, Japan

[21] Appl. No.: 160,907

[22] Filed: Feb. 26, 1988

[30] Foreign Application Priority Data

Feb. 27, 1987 [JP] Japan ................................. 62-43072

[51] Int. Cl.$^4$ ........................ B32B 27/08; B32B 27/38
[52] U.S. Cl. ................................... 428/335; 428/413; 428/415; 428/417; 428/435; 428/473.5
[58] Field of Search .................... 428/473.5, 335, 413, 428/417, 435, 415

[56] References Cited

U.S. PATENT DOCUMENTS

| | | | |
|---|---|---|---|
| 4,749,767 | 6/1988 | Chaudhari et al. | 428/473.5 |
| 4,755,424 | 7/1988 | Takeoka et al. | 428/473.5 |
| 4,767,656 | 8/1988 | Chee et al. | 428/473.5 |

*Primary Examiner*—Thomas J. Herbert
*Attorney, Agent, or Firm*—Sherman and Shalloway

[57] ABSTRACT

Disclosed is an interleaf-containing, fiber-reinforced epoxy resin prepreg, which comprises a fiber-reinforced epoxy resin matrix and an interleaf composed of a polyimide film subjected to a corona discharge treatment and/or a matting treatment.

This prepreg is suitable for the production of a composite material which is excellent in mechanical strength characteristics such as interlaminar shear strength and flexural breaking strength and having a high toughness.

9 Claims, 3 Drawing Sheets

INTERLEAF-CONTAINING, FIBER-REINFORCED EPOXY RESIN PREPREG

BACKGROUND OF THE INVENTION (1) Field of the Invention

The present invention relates to an interleaf-containing, fiber-reinforced epoxy resin prepreg. More particularly, the present invention relates to a fiber-reinforced epoxy resin prepreg which contains a surface-treated polyimide film as an interleaf and is suitable for the production of a laminate composite material having a high interlaminar shear strength, a high flexural breaking strength and a large deflection quantity and having a high strength and a high toughness.

(2) Description of the Related Art

A fiber-reinforced epoxy resin composite material has a high specific strength and a high specific elastic modulus and therefore, this composite material is widely used for the production of sport goods and construction materials for airplanes. Especially, an epoxy resin matrix composite material composed mainly of tetraglycidylaminodiphenyl methane (TGDDM)/diaminodiphenylsulfone (DDS) is vigorously used as carbon fiber-reinforced plastics (CFRP) for airplanes.

Since a composite material of this type is excellent in the hot-wet characteristic required for a construction material for an airplane, the composite material is widely used, but the composite material is generally poor in the toughness and is defective in that the impact resistance is insufficient.

Various improvements for eliminating this defect have been proposed.

For example, the surface treatment of the fiber or modification (toughening or the like) of an epoxy resin is carried out, but as is well-known, it is difficult to maintain a good balance between the hot-wet characteristic and the toughness.

Stitching of a prepreg laminate is conducted, but this method is not suitable for construction of a complicated large-size article and is insufficient in the practical utility.

An idea of a prepreg having an interleaf layer as disclosed in Japanese Patent Application Laid-Open Specification Nos. 63229/85 or 231738/85 is one new technique overcoming the above-mentioned defect. However, this technique is defective in that the hot-wet characteristic of the interleaf layer is insufficient and formation of a uniform thin resin layer by coating is difficult.

Furthermore, Japanese Patent Application Laid-Open Specification No. 231738/85 discloses an interleaf of a thermoplastic resin, and it is taught that a polyimide film is used as the interleaf. Since a thin polyimide film having a uniform thickness is excellent in the hot-wet characteristic, the film is suitable as the interleaf.

A prepreg having an interleaf as described above is ordinarily prepared by press-bonding the interleaf to a fiber-reinforced epoxy resin prepreg in the B stage (the state where polymerization is conducted to such an extent that a liquid thermosetting resin is rendered dry). However, if this interleaf is used, the bonding strength between the above-mentioned epoxy resin prepreg and the interleaf is insufficient. Accordingly, a composite material prepared from the prepreg having this interleaf or by laminating such prepregs is improved in the toughness but is not improved in mechanical strength characteristics such as tensile strength, flexural strength and interlaminar shear strength, and therefore, the composite material is not satisfactory.

SUMMARY OF THE INVENTION

It is a primary object of the present invention to provide a fiber-reinforced epoxy resin prepreg which can give a composite material which is excellent in mechanical strength characteristics such as interlaminar shear strength and flexural breaking strength and has a high toughness.

Another object of the present invention is to provide a fiber-reinforced epoxy resin prepreg which is very homogeneous and uniform, can be easily prepared on an industrial scale and can give a large-scale composite material having a complicated shape by lamination.

More specifically, in accordance with the present invention, there is provided an interleaf-containing, fiber-reinforced epoxy resin prepreg, which comprises a fiber-reinforced epoxy resin matrix and an interleaf composed of a polyimide film subjected to a corona discharge treatment and/or a matting treatment.

Figure 1:
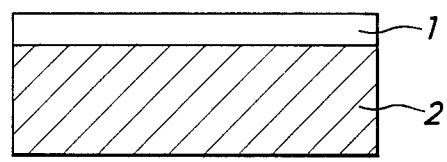
FIG. 1 is a sectional view illustrating a prepreg comprising one layer of an interleaf and one layer of a fiber-reinforced epoxy resin matrix.

In the drawings, reference numeral 1 represents an interleaf and reference numeral 2 represents a fiber-reinforced epoxy resin matrix.

DETAILED DESCRIPTION OF THE PREFERRED EMBODIMENTS

The interleaf of the present invention is a surface-treated polyimide film formed of a polymer having an imide skeleton. Examples of the structural formula of the imide skeleton are as follows:

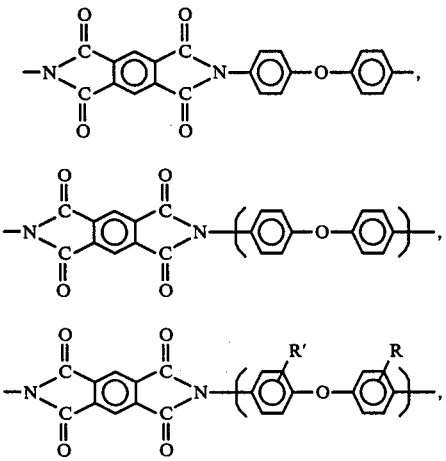

-continued

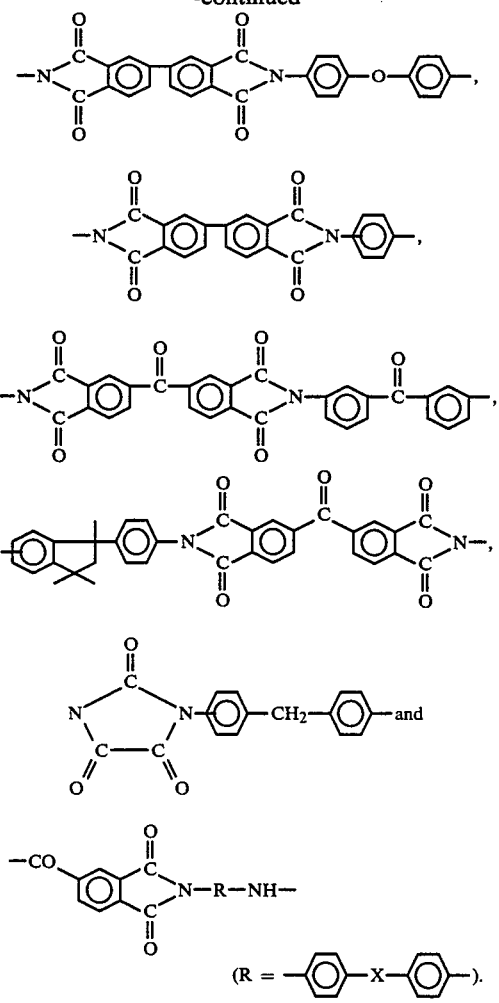

A film of a polyimide having an imide skeleton represented by the following structural formula (UPILEX ® R supplied by the Ube Industries, Ltd.):

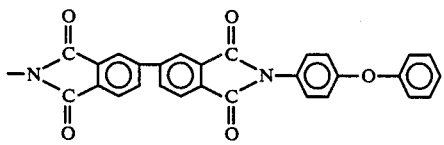

is especially preferred because it has a high elongation at break and exerts excellent effects.

The foregoing films can be prepared according to processes disclosed in Japanese Patent Application Laid-Open Specifications Nos. 113597/75, 27326/80, 28822/80 and 65227/80.

The thickness of the polyimide film is smaller than the thickness of a fiber-reinforced epoxy prepreg shown in FIG. 1. It is preferred that the thickness of the polyimide film be 5 to 40 μm, especially 10 to 30 μm. If the thickness of the polyimide film is smaller than 5 μm, the production is difficult and is economically disadvantageous. If the thickness exceeds 40 μm, the objects of the present invention can hardly be attained.

The polyimide film is surface-treated by a corona discharge treatment, a matting treatment or both the treatments in combination.

The process for the corona discharge treatment of an ordinary thermoplastic resin film is known, but it is not known that a polyimide film as described above is subjected to a corona discharge treatment. However, the polyimide film can be subjected to a corona discharge treatment according to known processes disclosed in Japanese Patent Publications Nos. 9411/56, 10614/57 and 10615/57. Preferred corona discharge treatment conditions differ according to the width and thickness of the film and the treatment speed. However, it is generally preferred that the discharge quantity be 30 to 150 $W/m^2 \cdot min$ expressed as the electric power value per unit time and per unit area. If the surface of the polyimide film is subjected to the corona discharge treatment, polar groups such as —OH groups, —COOH groups and —C=O groups are formed on the surface of the polyimide film, and the chemical affinity of the polyimide film with an epoxy resin are increased, with the result that the adhesiveness of the polyimide film to the epoxy resin prepreg is increased.

The matting treatment of the polyimide film can be carried out according to a known process, for example, the process disclosed in Japanese Patent Publication No. 11838/63. More specifically, fine particles of an inorganic substance or metal having an appropriate hardness, such as sand, titanium oxide, carborundom or calcium carbonate, are violently blown to the polyimide film surface together with compressed air to physically impair the film surface and mat the film, and the film is washed with water and dried by hot air to obtain a matted polyimide film. It is preferred that the polyimide film be subjected to the matting treatment to such an extent that the surface roughness of the matted film is 0.1 to 0.6 μm expressed as the center line average roughness (Ra). An anchoring effect is produced between the matted polyimide film and the epoxy resin by the matting treatment, and therefore, the adhesiveness to the epoxy resin repreg is increased.

If both of the above-mentioned corona discharge treatment and matting treatment are conducted on the polyimide film, the adhesiveness of the polyimide film to the epoxy resin prepreg is further improved. In this case, the order of the corona discharge treatment and the matting treatment is not critical.

Even if the above-mentioned treatment is conducted only on one surface of the polyimide film, since the film is thin, the surface treatment effect appears even on the untreated surface, and the adhesiveness of the film to the epoxy resin prepreg is improved. Of course, if both the surfaces are surface-treated, the adhesiveness is further improved.

The fiber-reinforced epoxy resin matrix is a prepreg formed by impregnating a reinforcing fiber with an epoxy resin.

The reinforcing fiber used in the present invention is selected from the group consisting of a glass fiber, a PAN type carbon fiber, a pitch type carbon fiber, an aramid fiber. a alumina fiber, a silicon carbide fiber and an Si-Ti-C-O fiber (TYRANNO FIBER supplied by Ube Industries, Ltd.). Two or more of these fibers can be used in combination.

The fiber can be used in the state arranged in one direction or in the form of a woven fabric. The fiber may be one subjected to a known surface treatment or sizing treatment.

The epoxy resin used in the present invention comprises a polyepoxide, a curing agent and a curing catalyst.

The polyepoxide is a compound having at least one epoxy group on the average in the molecule. The epoxy group may be present as the terminal group or may be present in the interior of the molecule. The polyepoxide may be a saturated or unsaturated aliphatic, cyclic aliphatic, aromatic or heterocyclic compound and may further contain a halogen atom, a hydroxyl group or an ether group.

For example, there can be mentioned glycidyl compounds of bisphenols A, B and S, glycidyl compounds of cresol and phenol novolaks, glycidyl compounds of aromatic amines and cyclic aliphatic polyepoxides.

As specific examples of the polyepoxide of this type, there can be mentioned 1,4-bis(2,3-epoxypropoxy)benzene and 4,4'-bis(2,3-epoxypropoxy)diphenyl ether.

As another type of the polyepoxide, there can be mentioned a glycidyl compound of a polyhydric phenol.

As another type of the polyepoxide, there can be mentioned a glycidyl compound of a polyhydric phenol.

As the polyhydric phenol to be used, there can be mentioned for example, resorcinol, catechol, hydroquinone, 2,3-bis(4-hydroxyphenyl)propane, 2,2-bis(4-hydroxyphenyl)butane, bis(4-hydroxyphenyl)sulfone (bisphenol S), bis(4-hydroxyphenyl)methane, tris(4-hydroxyphenyl)methane, 3,9-bis(3-methoxy-4-hydroxyphenyl)-2,4,8,10-tetraoxaspiro(5,5)undecane and halogen-containing phenols such as 2,2-bis(4-hydroxytetrabromophenyl)propane.

As still another type of the polyepoxide, there can be mentioned a glycidyl compound of a polyhydric alcohol.

As the polyhydric alcohol to be used, there can be mentioned, for example, glycerol, ethylene glycol, pentaerythritol and 2,2-bis(4-hydroxylcyclohexyl)propane.

As examples of the polyepoxide having an internal epoxy group, there can be mentioned 4-(1,2-epoxyethyl)-1,2-epoxycyclohexane, bis(2,3-epoxycyclopentyl)ether and 3,4-epoxycyclohexylmethyl-(3,4-epoxy)-cyclohexane carboxylate.

As still another type of the polyepoxide, there can be mentioned a glycidyl compound of an aromatic amine.

As the aromatic amine to be used, there can be mentioned diaminodiphenylmethane, metaxylene diamine, m-aminophenol and p-aminophenol.

Among polyepoxides, a diglycidyl ether of bisphenol A, a glycidyl compound of cresol novolak or phenol novolak, a glycidyl compound of diaminodiphenylmethane and a glycidyl compound of aminophenol are especially preferred.

These polyepoxides may be used singly or in the form of a mixture of two or more of thereof.

As specific examples of the curing agent used in the present invention, there can be mentioned polyamines, e.g., aromatic polyamines such as m-xylene diamine, o-phenylene diamine, m-phenylene diamine, 4,4'-methylene dianiline, 4,4-diaminodiphenylsulfone and 3,3'-diaminodiphenylsulfone and aliphatic polyamines such as triethylene tetraamine, diethylene triamine, isophorone diamine, 1,3-diaminocyclohexane-menthane diamine, cyanoethylated diethylene triamine, N-aminoethylpiperazine, methyliminobispropylamine, aminoethylethanol amine, polyether diamine and polymethylene diamine, acidic substances having a polycarboxylic group, a polycarboxylic anhydride group or a mixed group thereof, such as phthalic anhydride, succinic anhydride, maleic anhydride, hexahydrophthalic anhydride, pyromellitic anhydride, benzophenonetetracarboxylic anhydride, trimellitic anhydride, itaconic anhydride, citraconic anhydride, dodecenylsuccinic anhydride, florendic anhydride, a maleic anhydride adduct of methylcyclopentadiene, methyltetrahydrophthalic anhydride, a toluic anhydride adduct of maleic anhydride, cyclopentane-tetracarboxylic anhydride, alkylated endoalkylene-tetrahydrophthalic anhydride, ethylene glycol trimellitate and glycerol tristrimellitate, hydrazides such as isophthalic dihydrazide, adipic dihydrazide and sebacic dihydrazide, polyamides, and dicyandiamide and ketimine.

As the curing catalyst, there can be mentioned boron trifluoride complexes such as a boron trifluoride/monoethylamine complex and a boron trifluoride/piperidine complex, imidazole compounds such as 2-ethylimidazole and 2-ethyl-4-ethylimidazole, triphenyl phosphite, butane-tetracarboxylic acid, 1,8-diaza-bicyclo-(5,4,0)-undecene-7, and urea compounds such as N-(3-chloro-4-methylphenyl)-N',N'-dimethylurea, N-(3,4-dichlorophenyl)-N',N'-dimethylurea, N-(4-ethoxyphenyl)-N',N'-dimethylurea and N-(4-methyl-3-nitrophenyl)-N',N'-dimethylurea.

It is sufficient if the mixing ratio between the polyepoxide and the curing agent is close to the stoichiometric ratio, and when the curing catalyst is contained, the curing agent is preferably used in an amount slightly smaller than the stoichiometric amount.

Various thermoplastic resins can be added to the polyepoxide. For example, there can be mentioned poly-(ε-caprolactone), polybutadiene, a polybutadiene/acrylonitrile copolymer which optionally contains an amino group, a carboxyl group, a hydroxyl group or a group —SH, polyesters such as poly(ethylene terephthalate) and poly(butylene terephthalate), an acrylonitrile/butadiene/styrene copolymer, polyamides such as nylon 6, nylon 6,6, nylon 6,12 and copolymers thereof, poly(amidoimides), polyolefins, polyethylene oxide, poly(butyl methacrylate), impact-resistant polystyrene, sulfonated polyethylene, polyarylates such as a polyarylate derived from bisphenol A, isophthalic acid and terephthalic acid, poly(2,6-dimethylphenylenoxide), polyvinyl chloride and copolymers thereof, polyacetals and polyphenylene sulfide. Furthermore, thermosetting resins excellent in the heat resistance, such as bismaleimides and polyimides, can be incorporated. Moreover, the adhesiveness to the polyimide film can be improved by modifying the polyepoxide.

The interleaf-containing, fiber-reinforced epoxy resin prepreg has a structure, for example, as shown in the accompanying drawings.

Figure 2:
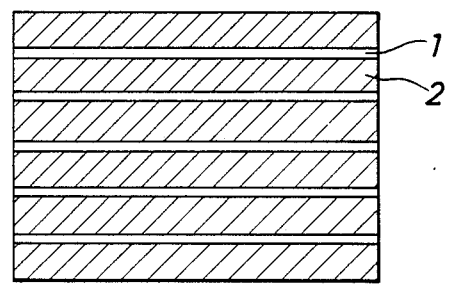
FIG. 2 is a sectional view illustrating a laminated prepreg formed by laminating and press-bonding layers of an interleaf and layers of a fiber-reinforced epoxy resin matrix alternately.

FIG. 1 is a sectional view showing a prepreg comprising one layer of an interleaf and one layer of a fiber-reinforced epoxy resin matrix, and FIG. 2 is a sectional view showing a laminated prepreg comprising layers of an interleaf and layers of a fiber-reinforced resin matrix, which are laminated and press-bonded alternately. In FIGS. 1, and 2, reference numeral 1 represents an interleaf and reference numeral 2 represents a fiber-reinforced epoxy resin matrix.

For the production of the prepreg of the present invention, there may be adopted any of known methods, except that a polyimide film which is subjected to a corona discharge treatment and/or a matting treatment is used as the interleaf.

For example, the prepreg of the present invention can be prepared according to a process in which a prepreg of a fiber-reinforced epoxy resin in the B stage is press-bonded to an interleaf. According to another process, an interleaf is press-bonded to a fiber-reinforced epoxy resin before the B stage and the bonded structure is heated to convert the epoxy resin to the B stage, whereby a prepreg is obtained.

As means for forming the fiber-reinforced epoxy resin prepreg used in the former process, there can be adopted known methods such as a method in which many filament yarns of the reinforcing fiber are arranged in one direction and a prepreg is formed by using such arranged yarns, a method in which many filament yarns are arranged, a filmy resin is molten and the yarns are impregnated with the melt to form a prepreg, a method in which a woven fabric or non-woven fabric of the reinforcing fiber is guided to a resin reservoir, impregnated with the resin and dried, and a method in which a sheet-shaped resin is molten and a woven fabric or non-woven fabric is impregnated with the melt to form a prepreg.

According to a modification of the latter process, an interleaf is press-bonded to a fiber-free epoxy resin before the B stage, a reinforcing fiber is impregnated with this epoxy resin and the impregnated fiber is then heated to convert the epoxy resin to the B stage.

In any of the foregoing processes, by using one layer of the interleaf and one layer of the fiber-reinforced epoxy resin matrix or by laminating layers of the interleaf and layers of the fiber-reinforced epoxy resin matrix alternately, a prepreg of the present invention as shown in FIG. 1 or 2 can be prepared.

Furthermore, a prepreg having a structure as shown in FIG. 2 can be prepared by laminating a plurality of prepregs as shown in FIG. 1.

The method for molding a composite material from a laminate of interleaf-containing prepregs is not particularly critical. For example, molding is performed according to a vacuum bag/autoclave curing method, a hot press molding method or a sheet winding method. A typical curing temperature is in the range of from 130° to 180° C. The curing time and pressure are appropriately selected, and pre-curing or post curing may be carried out.

In the interleaf-containing, fiber-reinforced epoxy resin prepreg of the present invention, a polyimide film excellent in heat resistance and mechanical characteristics such as tensile strength and elongation at break is used as the interleaf and this polyimide film is subjected to a specific surface treatment. Accordingly, the bonding force between the polyimide film and the fiber-reinforced epoxy resin matrix is increased, and therefore, a composite material prepared from the prepreg of the present invention is excellent in mechanical strength characteristics such as interlaminar shear strength and flexural breaking strength and has a very high toughness.

Furthermore, the prepreg of the present invention is very uniform and homogeneous and can be easily prepared on an industrial scale, and a large-size composite material having a complicated shape can be prepared by laminating prepregs of the present invention.

Accordingly, the present invention makes prominent contributions to the art.

The present invention will now be described in detail with reference to the following examples and comparative examples. Incidentally, in the examples and comparative examples, the mechanical properties were measured according to the following methods.

(1) Measurement Device
Tensilon 5T supplied by Toyo-Baldwin was used.
(2) Bending Test
The three-point bending method was adopted. The span/thickness ratio was adjusted to 40 and the crosshead speed was adjusted to 2 mm/min. The measurement was conducted at a temperature of 23° C. and a relative humidity of 50%.
(3) Interlaminar Shear Strength
The short beam method was adopted. The span/thickness ratio was adjusted to 4 and the crosshead speed was adjusted to 2 mm/min. The measurement was conducted at a temperature of 23° C. and a relative humidity of 50%.

EXAMPLE 1

A resin composition formed by mixing 200 g of N,N,N',N'-tetraglycidylaminodiphenylmethane with 100 g of 4,4'-diaminodiphenylsulfone was dissolved in methylethylketone to form a 60% solution.

Filament yarns of a carbon fiber (Besfight HTA3000 supplied by Toho Rayon) arranged in one direction were impregnated with this resin solution and were wound on a drum covered with a Teflon release paper.

The resin-impregnated fiber was cut and opened by a cutter and heated at 120° C. for 5 to 15 minutes in a hot air circulation drier to prepare a prepreg.

The obtained prepreg had a thickness of 300 μm and the content of the fiber was 62% by volume. The prepreg was cut into a size of 90 mm×260 mm.

Separately, both the surfaces of a polyimide film (UPILEX ® R supplied by Ube Industries, Ltd; thickness=7.5 μm) were subjected to a corona discharge treatment under a condition of 50 W/m².min by using a high-frequency power source device (corona surface treatment device)(supplied by Kasuga Denki), and the treated film was cut into a size of 90 mm×260 mm.

The above-mentioned prepreg was bonded to the polyimide film subjected to the corona discharge treatment to prepare an interleaf-containing prepreg as shown in FIG. 1.

Six plies of this interleaf-containing prepreg were laminated in the 0° direction and were press-molded at 180° C. under a pressure of 7 kg/cm² for 2 hours. Post curing was carried out at 190° C. in an oven for 5 hours to obtain a composite material.

A test piece for the 0° bending test, which had a length of 85 mm and a width of 12.7 mm, and a test piece for the 0° interlaminar shear test, which had a length of 28 mm and a width of 12.7 mm, were cut out from the so-obtained composite material. By using these test pieces, the flexural breaking strength, the deflection at flexural bending and the interlaminar shear strength were measured. The obtained results are shown in Table 1.

EXAMPLE 2

A composite material was prepared in the same manner as described in Example 1 except that the thickness of the polyimide film was changed to 12.5 μm, and the physical properties of the composite material were measured. The obtained results are shown in Table 1.

EXAMPLE 3

A composite material was prepared in the same manner as described in Example 1 except that the thickness of the polyimide film was changed to 25 μm and the corona discharge treatment was changed to a matting treatment (Ra=0.2 to 0.3 μm), and the physical properties of the composite material were measured. The obtained results are shown in Table 1.

EXAMPLE 4

A composite material was prepared in the same manner as described in Example 3 except that subsequently to the matting treatment, the corona discharge treatment was carried out in the same manner as described in Example 1. The physical properties of the composite material were measured. The obtained results are shown in Table 1.

COMPARATIVE EXAMPLE 1

A composite material was prepared in the same manner as described in Example 1 except that the polyimide film as the interleaf was not used. The physical properties of the composite material were measured. The obtained results are shown in Table 1.

COMPARATIVE EXAMPLE 2

A composite material was prepared in the same manner as described in Example 1 except that the polyimide film was not subjected to the corona discharge treatment. The physical properties of the composite material were measured. The obtained results are shown in Table 1.

COMPARATIVE EXAMPLE 3

A composite material was prepared in the same manner as described in Example 2 except that the polyimide film was not subjected to the corona discharge treatment. The physical properties of the composite material were measured. The obtained results are shown in Table 1.

COMPARATIVE EXAMPLE 4

Figure 3:
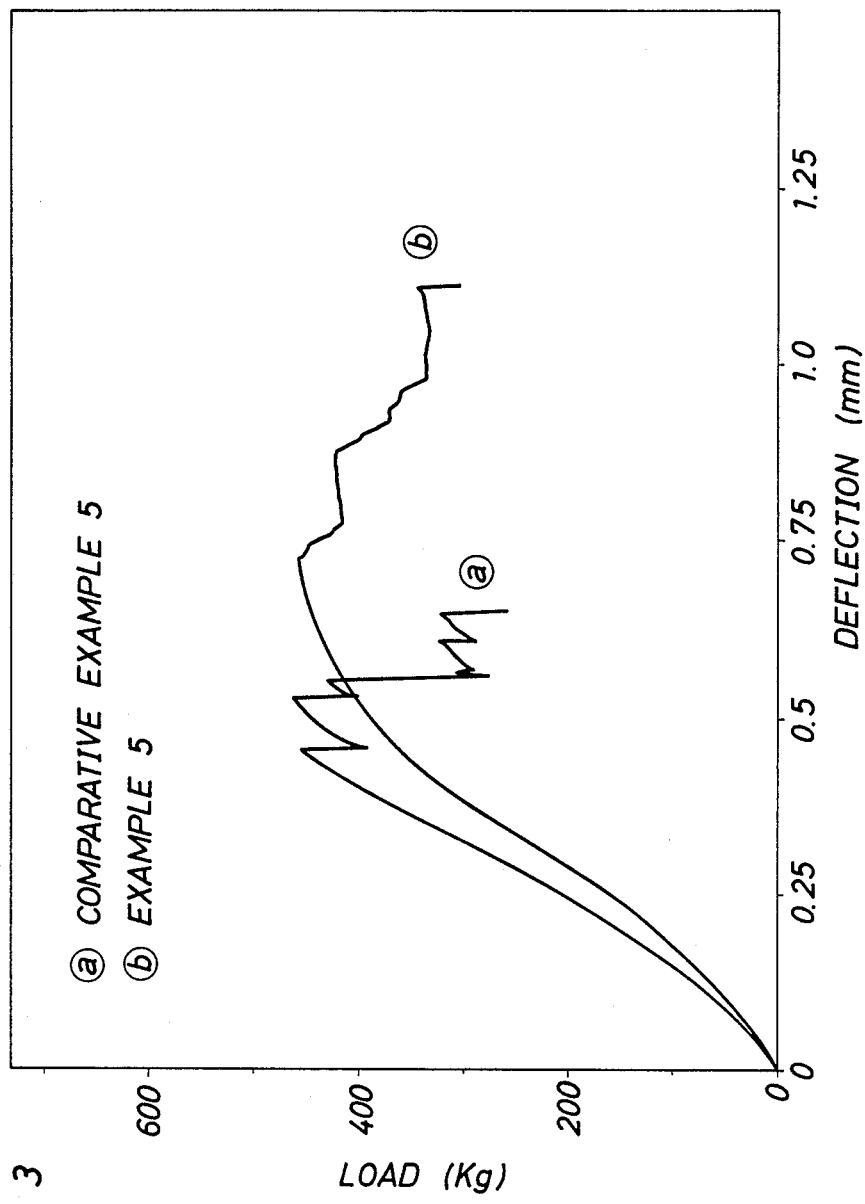
FIG. 3 is a load-deflection curve obtained at the 0° interlaminar shear test of a unidirectional laminated composite material.
Figure 4:
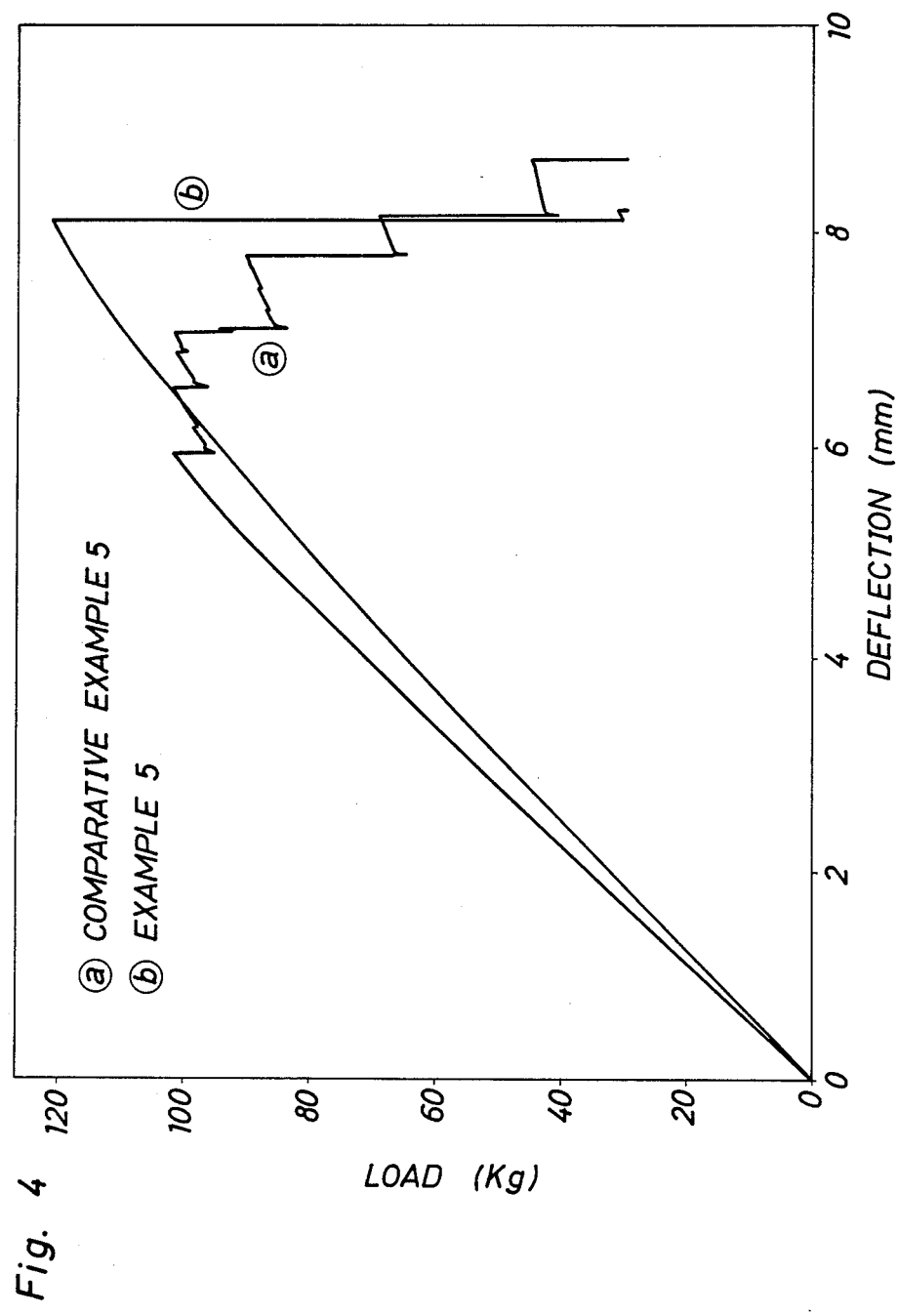
FIG. 4 is a load-deflection curve at the 0° bending test of a unidirectional laminated composite material.

A composite material was prepared in the same manner as described in Example 3 except that the polyimide film was not subjected to the matting treatment. The physical properties of the composite material were measured. The obtained results are shown in Table 1.

the 0° direction and autoclave molding was carried out at a highest temperature of 180° C. under a highest pressure of 7 kg/cm² for 6 hours. Then, post curing was carried out at 190° C. in an oven for 5 hours to form a composite material. A test piece for the 0° interlaminar shear test, having a length of 28 mm and a width of 12.7 mm, and a test piece for the 0° bending test, having a length of 85 mm and a width of 12.7 mm, were cut out from the composite material. Load-deflection curves obtained at both the tests are shown in FIGS. 3 and 4.

COMPARATIVE EXAMPLE 5

The procedures of Example 5 were repeated in the same manner except that the polyimide film as the interleaf was not obtained. The obtained load-deflection curves are shown in FIGS. 3 and 4.

From the results obtained in Example 5 and Comparative Example 5, it is seen that the composite material prepared from the prepreg of the present invention has a high strength and a high toughness. Moreover, from FIGS. 3 and 4, it is seen that in the composite material prepared from the prepreg of the present invention, delamination is hardly caused.

We claim:

1. An interleaf-containing, fiber-reinforced epoxy resin prepreg comprising a fiber-reinforced epoxy resin matrix layer and an interleaf layer, said interleaf layer composed of a polyimide film which has been subjected to a surface treatment selected from the group consisting of corona discharge treatment, matting treatment and combinations thereof, said polyimide film being a film of a polyimide having an imide skeleton represented by the structural formula

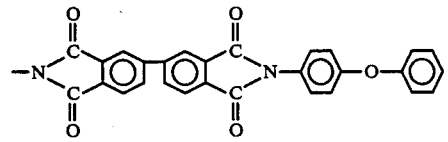

2. An interleaf-containing, fiber-reinforced epoxy

TABLE 1

| | Interleaf | | | Physical Properties | | |
|---|---|---|---|---|---|---|
| *Ex. & CEx. | Kind | Thickness (μm) | Surface Treatment | Strength (kgf/mm²) at Flexural Breaking | Deflection (mm) at Flexural Bending | Interlaminar Shear Strength (kgf/mm²) |
| Ex. 1 | EPILEX ® R | 7.5 | corona discharge treatment | 200 | 12.7 | 12.3 |
| Ex. 2 | " | 12.5 | " | 197 | 12.1 | 12.2 |
| Ex. 3 | " | 25 | matting treatment | 229 | 13.2 | 12.7 |
| Ex. 4 | " | 25 | matting treatment and corona discharge treatment | 235 | 13.6 | 13.2 |
| CEx. 1 | not used | not used | not effected | 180 | 8.41 | 12.0 |
| CEx. 2 | UPILEX ® R | 7.5 | " | 182 | 12.5 | 10.8 |
| CEx. 3 | " | 12.5 | " | 183 | 12.0 | 11.0 |
| CEx. 4 | " | 25 | " | 182 | 12.4 | 11.3 |

*Ex. = Example,
CEx. = Comparative Example

EXAMPLE 5

An interleaf-containing prepreg was prepared in the same manner as described in Example 1 except that the thickness of the prepreg was changed to 140 μm from 300 μm. Then, 15 plies of this prepreg were laminated in resin prepreg as set forth in claim 1, wherein the thickness of the polyimide film is 5 to 40 μm.

3. A composite material comprising a plurality of said interleaf-containing, fiber-reinforced epoxy resin prepregs according to claim 1, said plurality of interleaf-containing, fiber-reinforced epoxy resin prepregs being laminated one to another.

4. A interleaf-containing, fiber-reinforced epoxy resin prepreg as set forth in claim 1, wherein the corona discharge treatment is carried out at a discharge quantity of 30 to 150 W/m$^2$ min.

5. An interleaf-containing, fiber-reinforced epoxy resin prepreg as set forth in claim 1, wherein the matting treatment is carried out so that the surface roughness Ra is in the range of from 0.1 to 0.6 μm.

6. An interleaf-containing, fiber-reinforced epoxy resin repreg as set forth in claim 1, wherein the polyimide film is one subjected to both the corona discharge treatment and the matting treatment.

7. An interleaf-containing, fiber-reinforced epoxy resin prepreg as set forth in claim 1, wherein the reinforcing fiber is at least one member selected from the group consisting of a glass fiber, a PAN type carbon fiber, a pitch type carbon fiber, an aramid fiber, an alumina fiber, a silicon carbide fiber and an Si-Ti-C-O fiber.

8. A interleaf-containing, fiber-reinforced epoxy resin prepreg as set forth in claim 1, wherein the epoxy resin comprises a polyepoxide, a curing agent and a curing catalyst.

9. A interleaf-containing, fiber-reinforced epoxy resin prepreg as set forth in claim 8, wherein the polyepoxide is a diglycidyl ether of bisphenol A, a glycidyl compound of cresol novolak or phenol novolak, a glycidyl compound of diaminodiphenylmethane, or a glycidyl compound of aminophenol.

* * * * *